2,962,462

THERMOSETTABLE INTERPOLYMERS CONTAINING HYDROXYL GROUPS

Earl C. Chapin, Springfield, Mass., and Raymond H. Reinhard, Galveston, and William F. Yates, Texas City, Tex., assignors to Monsanto Chemical Company, St. Louis, Mo., a corporation of Delaware No Drawing. Filed Oct. 20, 1958, Ser. No. 768,026

11 Claims. (Cl. 260—23.7)

This invention relates to new interpolymer systems. More particularly, it relates to novel thermosettable interpolymers containing hydroxyl groups.

Commercially available styrene-allyl alcohol copolymers when esterified with unsaturated fatty acids require extensive heating at excessively high temperatures to attain sufficient specific viscosity for use in, e.g., varnishes. Under such extreme conditions, non-esterified hydroxyl groups are decomposed.

It is an object of this invention to provide novel interpolymers.

Another object is to provide novel interpolymers containing hydroxyl groups.

Another object is to provide novel thermosettable interpolymers containing hydroxyl groups.

A further object is to provide novel thermosettable interpolymers containing hydroxyl groups which may be esterified with unsaturated fatty acids under reasonable reaction conditions to produce compositions having sufficient specific viscosity and hydroxyl content for use in competitive surface coating compositions.

These and other objects are attained by interpolymerizing a styrene compound with allyl or methallyl alcohol and a polyethylenically unsaturated monomer.

The following examples are given in illustration of this invention and are not intended as limitations thereof. Where parts are mentioned they are parts by weight.

Example I

A mixture of 70 parts of allyl alcohol, 30 parts of styrene, 5 parts of triallyl cyanurate and 3 parts of ditertiary butyl peroxide is pumped through a 30 foot length of a $7/16$ inch I.D. stainless steel tubular coil reactor at a rate allowing 60 minutes dwell time within the reactor. The reactor contents are maintained at 160° C. under autogenous pressure. The product is a colorless syrup consisting essentially of the interpolymer dissolved in unreacted monomers. The monomers are removed by vacuum distillation at about 150° C. and 100 mm. of mercury pressure. The clear, brittle solid resin obtained is soluble in methyl ethyl ketone, dimethyl formamide and xylene-butanol mixtures. The interpolymer contains about 4.9% hydroxyl groups by weight and has a calculated composition of about 26.5% allyl alcohol, 70.5% styrene and 3% triallyl cyanurate, all by weight.

Example II

A reactor is charged with 300 parts of allyl alcohol, is sealed and is purged with nitrogen to remove substantially all oxygen. The reactor contents are heated to about 160±5° C. and a solution consisting of 200 parts of allyl alcohol, 300 parts of styrene, 35 parts of 50% divinyl benzene and 12 parts of 90% aqueous hydrogen peroxide is pumped into the reactor over a 4 hour period. Following this, another solution consisting of 200 parts of allyl alcohol, 10 parts of 90% aqueous hydrogen peroxide and 8 parts of 50% divinyl benzene is charged over a 2 hour period. The reaction mixture is continually stirred and maintained at a temperature of 160±5° C. throughout the entire polymerization sequence. The product obtained is a clear yellow viscous syrup consisting essentially of the interpolymer dissolved in unreacted monomer. The monomers are removed by vacuum distillation at about 150° C. and 100 mm. of mercury pressure to obtain a clear, brittle solid in about 48.5% yield, based upon total monomer, which is soluble in methyl ethyl ketone, dimethyl formamide and xylenebutanol mixtures. The interpolymer contains about 6.5% hydroxyl groups by weight and has a specific viscosity of 1.5 as measured at 25° C. on a solution of 10 grams of polymer dissolved in 100 ml. of methyl ethyl ketone. Analysis shows this interpolymer to have a calculated composition of about 73.5% styrene, 22% allyl alcohol and 4.5% divinyl benzene, all by weight.

Similar results are obtained when diallyl ether or triallyl cyanurate are substituted for the divinyl benzene in the foregoing examples.

The three components of the system are allyl or methallyl alcohol, styrene or a ring-substituted styrene and a poly-ethylenically unsaturated monomer. The allyl or methallyl alcohol, or a mixture thereof, may constitute from 10-40% by weight of the interpolymer, the styrene compound may constitute from 60-90% by weight of the interpolymer and the poly-ethylenically unsaturated monomer may constitute from 0.1-10% by weight of the interpolymer. In place of the styrene employed in the examples may be substituted a ring-substituted alkylstyrene such as ortho-, meta- and para-, methyl, ethyl, butyl, etc. styrenes, a ring-substituted chlorostyrene such as the mono-, di and tri-chlorostyrenes, or a ring-substituted alkylchlorostyrene such as 2-methyl-4-chlorostyrene, etc. Mixtures of two or more such styrene compounds may also be used. Similarly, in place of the triallyl cyanurate and divinyl benzene employed in the examples may be substituted diallyl ether, dicyclopentadiene, ethylene glycol diacrylate and ethylene glycol dimethacrylate.

In preparing the interpolymers of this invention the three monomeric components should be mixed together with or without an organic solvent inert to the reactants. Suitable solvents include xylene, toluene, benzene, etc. The polymerization is effected by heating the monomeric mixture at from 120-180° C. under autogenous pressures. In a preferred embodiment, monomeric mixtures comprising from 50-90% by weight of allyl or methallyl alcohol, from 5-50% by weight of the styrene compound and from 0.1-15% by weight of the poly-ethylenically unsaturated monomer are employed.

The polymerization may be carried out in the presence of a free radical polymerization initiator such as hydrogen peroxide, ditertiarybutyl peroxide, tertiarybutyl perbenzoate, pinacolone peroxide, cumene hydroperoxide, etc. The amount of initiator may vary between 0.1 and 5 parts by weight per 100 parts of total monomers.

In one embodiment of this invention, the poly-ethylenically unsaturated monomer employed is triallyl cyanurate. Triallyl cyanurate is relatively slow reacting, making it preferable to employ batch processes when using this monomer.

In another preferred embodiment of this invention, the poly-ethylenically unsaturated monomer employed is divinyl benzene. Divinyl benzene is highly reactive and in batch processes will enter the polymer at a relatively rapid rate, leading to a premature depletion of the divinyl benzene component, heterogeneity of the final product and possible gellation. For these reasons it is preferred to use continuous processes whenever divinyl benzene is employed. The most preferred continuous process comprises continuously charging a pressure reactor with a mixture of the 3 components in fixed predetermined proportions while simultaneously continuously withdrawing a product stream at a volumetrically equal rate. The rates employed should permit dwell times within the reactor of from 5–300 minutes.

The reactor contents are continually mixed to provide maximum homogeneity thereof. Experimentation will easily determine the correct monomeric mixture to be used in conjunction with a given temperature, contact time and catalyst concentration, if any, to prepare a given interpolymer within the scope of this invention. This continuous process may be advantageously used in conjunction with the other poly-ethylenically unsaturated monomers of this invention. However, its efficacy varies with the reactivity of said monomers.

The reaction products are generally syrupy liquids which comprise a solution of the interpolymer in unreacted monomer and solvent, if such is employed. The interpolymer is easily recovered from the syrup by conventional techniques, e.g., removal of the monomers and solvent by vacuum distillation, etc. The interpolymers are generally hard, colorless, brittle resins containing from about 1–10% hydroxyl groups by weight.

The interpolymers of this invention may be esterified with unsaturated fatty acids containing from 10–18 carbon atoms and dissolved in a suitable solvent to provide particularly useful surface coating compositions. From 30–120 parts of unsaturated fatty acids are usually employed per 100 parts of interpolymer. Sufficient solvent is employed to provide coating compositions containing from 30–60% solids by weight. The solvents employed are inert organic liquids in which the esterified interpolymers are soluble, e.g., xylene, xylene-butanol mixtures, etc. Examples of suitable unsaturated fatty acids include the decylenic acids, palmitoleic acid, oleic acid, linoleic acid, linolenic acid, etc. The fatty acid derivatives of drying or semi-drying oils containing mixtures of these unsaturated fatty acids may also be employed, e.g., the fatty acid derivatives of cottonseed oil, tall oil, soybean oil, linseed oil, dehydrated castor oil, safflower oil, etc., or mixtures thereof.

*Example III*

A mixture of 65 parts of the interpolymer obtained in Example II and 35 parts of soybean fatty acids is heated. Reaction occurs at about 200° C. and the heating is continued for another hour, raising the temperature gradually to 225° C. The esterified interpolymer is then dissolved in sufficient xylene to make a 50% solids solution which is then cast on a clean glass plate. The film is baked at 150° C. for about 20 minutes. The cured, hard, clear film is highly resistant to water, detergents and sodium hydroxide solutions and provides an excellent protective coating.

These esterified interpolymers may also be used in combination with relatively minor proportions, i.e., from 5–35% by weight, of other coating resins. These include oil soluble phenolic resins; the 1–4 carbon alkyl ethers of polymethylol ureas and melamines such as the ethylated or butylated ethers of dimethylol urea, trimethylol melamine, tetramethylol melamine, etc.; alkyd resins derived from phthalic anhydride, vegetable oil fatty acids such as cottonseed oil fatty acids, soybean oil fatty acid, etc. and polyols such as glycerine, ethylene glycol, polyethylene glycol, pentaerythritol, sorbitol, etc.; epoxy resins having an epoxide equivalent of from 300–2000 derived from the condensation of epichlorohydrin with diols such as bisphenols, glycols, diglycidyl ethers, etc.

*Example IV*

About 6 parts of the 50% solids solution of esterified interpolymer prepared in Example III are mixed with 2 parts of a 50% solids xylene solution of a butylated ether of trimethylol melamine. The mixture is then cast on a clean glass plate and baked at 150° C. for about 20 minutes. The cured, hard, clear film is substantially unaffected by common solvents, water, sodium hydroxide, etc.

The interpolymers of this invention may also be thermoset by the application of heat, as follows.

*Example V*

About 20 parts of the interpolymer solids of Example II are heated to a temperature of about 250° C. and maintained thereat for 30 minutes. The interpolymer is observed to melt and then fuse into a solid mass. At the end of this heating period the solid mass is insoluble in the common solvents such as methyl ethyl ketone, dimethyl formamide and xylene-butanol mixtures.

Various pigments, fillers, dyes and other conventional additives may be added to the surface coating solutions such as those of Examples III and IV. Other organic solvents may be employed as the vehicle, e.g., ketones, such as acetone and methyl ethyl ketone, benzene and aliphatic alcohols.

It is obvious that many variations may be made in the products and processes of this invention without departing from the spirit and scope thereof.

What is claimed is:

1. A thermosettable interpolymer comprising from 10–40% by weight of an ethylenically unsaturated alcohol, from 60–90% by weight of a styrene compound and from 0.1–10% by weight of a polyethylenically unsaturated monomer; said ethylenically unsaturated alcohol being selected from the group consisting of allyl alcohol, methallyl alcohol and mixtures thereof, said styrene compound being selected from the group consisting of styrene, ring-substituted alkylstyrenes, ring-substituted chlorostyrenes, ring-substituted alkylchlorostyrenes and mixtures thereof and said poly-ethylenically unsaturated monomer being selected from the group consisting of divinyl benzene, triallyl cyanurate, diallyl ether, dicyclopentadiene, ethylene glycol diacrylate and ethylene glycol dimethacrylate.

2. A thermosettable interpolymer as in claim 1 wherein the ethylenically unsaturated alcohol is allyl alcohol.

3. A thermosettable interpolymer as in claim 1 wherein the styrene compound is styrene.

4. A thermosettable interpolymer as in claim 1 wherein the poly-ethylenically unsaturated monomer is divinyl benzene.

5. A thermosettable interpolymer as in claim 1 wherein the poly-ethylenically unsaturated monomer is triallyl cyanurate.

6. A thermosettable interpolymer as in claim 1 wherein the ethylenically unsaturated alcohol is allyl alcohol, the styrene compound is styrene and the poly-ethlenically unsaturated monomer is divinyl benzene.

7. A thermosettable interpolymer as in claim 1 wherein the ethylenically unsaturated alcohol is allyl alcohol, the styrene compound is styrene and the poly-ethlenically unsaturated monomer is triallyl cyanurate.

8. A process for preparing a thermosettable interpolymer comprising from 10–40% by weight of an ethylenically unsaturated alcohol, from 60–90% by weight of a styrene compound and from 0.1–10% by weight of a poly-ethylenically unsaturated monomer which comprises heating a monomeric mixture of the components in a substantially oxygen-free atmosphere at from 120–180° C. under autogenous pressure; said ethylenically unsaturated alcohol being selected from the group consisting of allyl alcohol, methallyl alcohol and mixtures thereof, said styrene compound being selected from the group consisting of styrene, ring-substituted alkylstyrenes, ring-substituted chlorostyrenes, ring-substituted alkylchlorostyrenes, and mixtures thereof, and said poly-ethylenically unsaturated monomer being selected from the group consisting of divinyl benzene, triallyl cyanurate, diallyl ether, dicyclopentadiene, ethylene glycol diacrylate and ethylene glycol dimethacrylate.

9. A process as in claim 8 wherein from 0.5–5% by weight, based upon the total monomers, of a free radical polymerization initiator is employed.

10. A surface coating composition comprising an organic solvent solution of an interpolymer esterified with from 30–120 parts by weight, per 100 parts of interpolymer, of unsaturated fatty acids containing from 10–18 carbon atoms; said interpolymer comprising (a) from 10–40% by weight of an ethylenically unsaturated alcohol selected from the group consisting of allyl alcohol, methallyl alcohol and mixtures thereof, (b) from 60–90% by weight of a styrene compound selected from the group consisting of styrene, ring-substituted alkylstyrenes, ring-substituted chlorostyrenes, ring-substituted alkylchlorostyrenes and mixtures thereof and (c) from 0.1–10% by weight of a poly-ethylenically unsaturated monomer selected from the group consisting of divinyl benzene, triallyl cyanurate, diallyl ether, dicyclopentadiene, ethylene glycol diacrylate and ethylene glycol dimethacrylate.

11. A surface coating composition as in claim 10 containing from 5–35% by weight, based upon the esterified interpolymer solids, of an auxiliary surface coating resin selected from the group consisting of oil soluble phenolic resins, 1–4 carbon atom alkyl ethers of polymethylol ureas, 1–4 carbon atom alkyl ethers of polymethylol melamines, alkyd resins derived of phthalic anhydride, vegetable oil fatty acids and polyols and epoxy resins having an epoxide equivalent of from 300–2000 prepared by condensing epichlorohydrin with a diol.

References Cited in the file of this patent
UNITED STATES PATENTS

| | | |
|---|---|---|
| 2,588,890 | Shokal et al. | Mar. 11, 1952 |
| 2,630,430 | Shokal et al. | Mar. 3, 1953 |
| 2,855,388 | Chapin et al. | Oct. 7, 1958 |

OTHER REFERENCES

Boundy et al.: Styrene, Its Polymers, Copolymers and Derivatives, Reinhold (1952), pages 307, 723–728.